(12) United States Patent
Watanabe

(10) Patent No.: US 9,809,223 B2
(45) Date of Patent: Nov. 7, 2017

(54) DRIVING ASSISTANT FOR VEHICLES

(71) Applicant: SUBARU CORPORATION, Tokyo (JP)

(72) Inventor: Akihiro Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/200,852

(22) Filed: Jul. 1, 2016

(65) Prior Publication Data

US 2017/0008531 A1   Jan. 12, 2017

(30) Foreign Application Priority Data

Jul. 9, 2015   (JP) ................. 2015-137572

(51) Int. Cl.
*B60W 30/18* (2012.01)
*B60W 40/04* (2006.01)
*B60W 40/06* (2012.01)

(52) U.S. Cl.
CPC ...... *B60W 30/18163* (2013.01); *B60W 40/04* (2013.01); *B60W 40/06* (2013.01); *B60W 2520/10* (2013.01); *B60W 2550/10* (2013.01); *B60W 2550/30* (2013.01)

(58) Field of Classification Search
None
See application file for complete search history.

(56) References Cited

U.S. PATENT DOCUMENTS 8,165,776 B2 * 4/2012 Sugawara ............ B60W 30/12
340/436
2009/0088925 A1   4/2009 Sugawara et al.
2015/0266477 A1 * 9/2015 Schmudderich ...... B60W 30/09
701/98
2016/0339913 A1 * 11/2016 Yamashita .......... B60W 30/146
2016/0347175 A1 * 12/2016 Yamashita ............. B60K 31/00

FOREIGN PATENT DOCUMENTS

| EP | 3056405 A1 | 8/2016 |
| JP | 2009-078735 A | 4/2009 |
| JP | 2009-294943 A | 12/2009 |
| JP | 2010-274887 A | 12/2010 |
| WO | 2015/052865 A1 | 4/2015 |

OTHER PUBLICATIONS

Decision to Grant which issued in corresponding Japanese Patent Application No. 2015-137572, dated Dec. 20, 2016.
Notice of Reasons for Refusal issued in corresponding Japanese Patent Application No. 2015-137572, dated Sep. 27, 2016.

* cited by examiner

*Primary Examiner* — Krishnan Ramesh
(74) *Attorney, Agent, or Firm* — McDermott Will & Emery LLP

(57) ABSTRACT

A driving assistant for vehicles provides lane change assistance, and includes a proposed lane change section setting unit and a lane change determination unit. The proposed lane change section setting unit provides setting of a proposed lane change section that is a proposed section where an own vehicle enters an adjacent lane, based on relative speeds and relative positions of the own vehicle to respective ones of a plurality of parallel-travelling vehicles on the adjacent lane. The lane change determination unit determines whether or not the own vehicle is allowed to enter the proposed lane change section, based on a moving speed of the proposed lane change section and a speed of the own vehicle.

4 Claims, 3 Drawing Sheets

DRIVING ASSISTANT FOR VEHICLES

CROSS-REFERENCE TO RELATED APPLICATIONS

The present application claims priority from Japanese Patent Application No. 2015-137572 filed on Jul. 9, 2015, the entire contents of which are hereby incorporated by reference.

BACKGROUND

The technology relates to a driving assistant for vehicles that may assist an own vehicle with a lane change between adjacent lanes.

In recent years, various assistants for vehicles such as automobiles have been developed and put into practical use. Such an assistant may be installed with a camera or a radar system and may recognize travelling environment around a vehicle, to lessen an operation burden of a driver. Such assistants may provide various functions of travelling assistance, one of which may be a function of assisting an own vehicle in making a lane change safely.

For instance, Japanese Unexamined Patent Application Publication (JP-A) No. 2009-294943 discloses a technique that aims at assisting with a safe lane change. This technique involves: determining a travelling state of a vehicle on a target lane that an own vehicle is going to enter; determining presence or absence of a vehicle that is going to enter the target lane from outside a lane on which the own vehicle is travelling; and setting guide information based on the vehicle on the target lane and the vehicle outside the target lane.

SUMMARY

The lane change assistance as disclosed in JP-A No. 2009-294943 considers the presence of another vehicle that is going to enter the target lane of the lane change. On the other hand, this technique is not adapted for travelling states of a plurality of other vehicles on the target lane of the lane change, and may therefore fail in assisting with a quick and safe lane change, in a case with small inter-vehicle distances between the vehicles on the target lane of the lane change. The same may apply to a case with a small speed difference between the own vehicle and a vehicle on an adjacent lane, i.e., in a case in which the own vehicle and the vehicle on the adjacent lane are travelling in parallel.

It is desirable to provide a driving assistant for vehicles that makes it possible to assist with a quick and safe lane change in response to travelling states of vehicles on a target lane of the lane change.

An aspect of the technology provides a driving assistant for vehicles that determines whether or not an own vehicle is allowed to enter an adjacent lane that is adjacent to a lane on which the own vehicle is travelling, and provides lane change assistance. The driving assistant for vehicles includes a proposed lane change section setting unit and a lane change determination unit. The proposed lane change section setting unit provides setting of a proposed lane change section that is a proposed section where the own vehicle enters the adjacent lane, based on relative speeds and relative positions of the own vehicle to respective ones of a plurality of parallel-travelling vehicles on the adjacent lane. The lane change determination unit determines whether or not the own vehicle is allowed to enter the proposed lane change section, based on a moving speed of the proposed lane change section and a speed of the own vehicle.

DETAILED DESCRIPTION

In the following, some implementations of the technology are described in detail with reference to the drawings.

Figure 1:
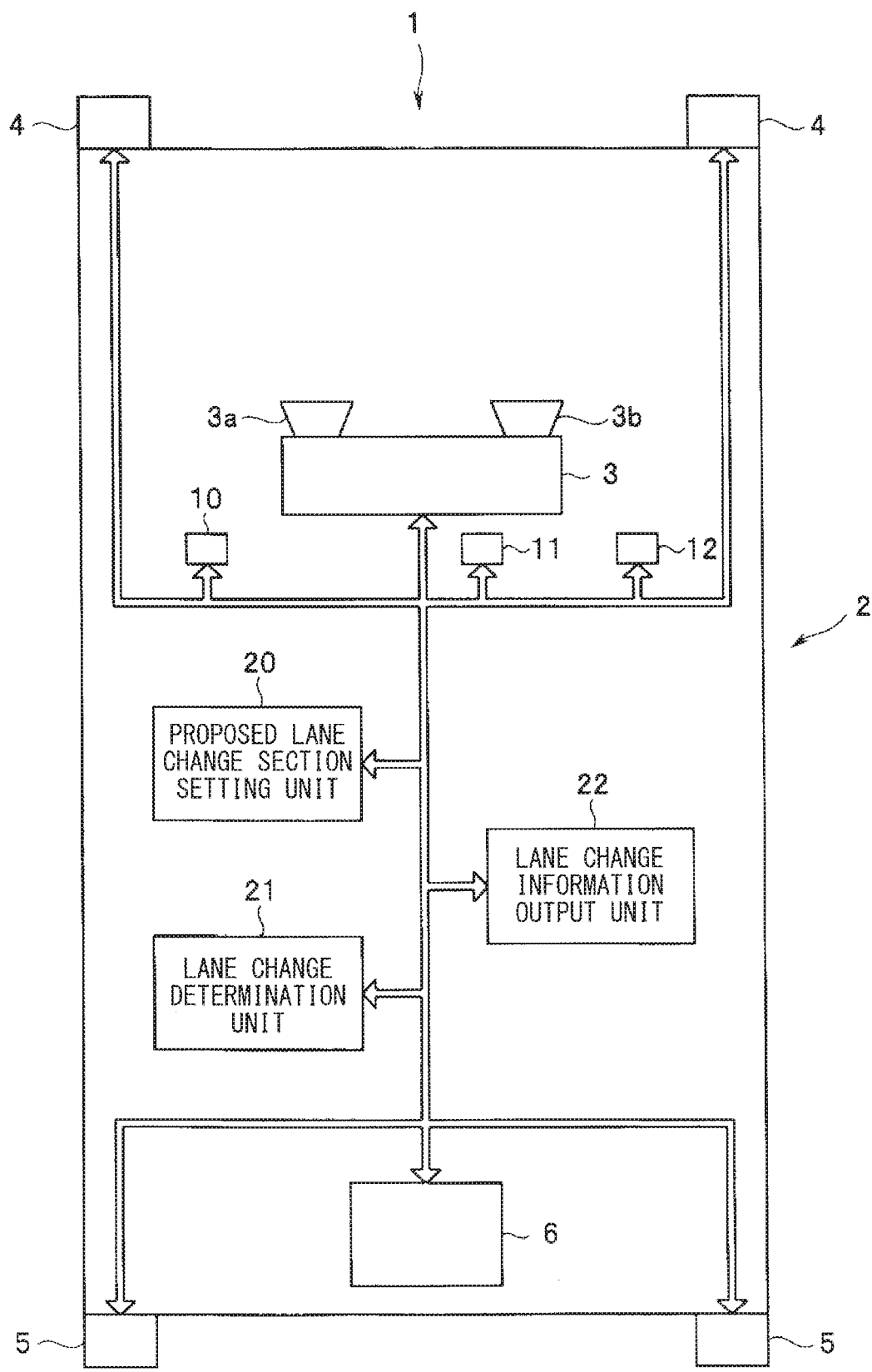
FIG. 1 illustrates an example of a configuration of a driving assistant for vehicles according to an implementation of the technology.

In FIG. 1, a reference character 1 designates a vehicle such as an automobile. In one implementation, the vehicle 1 may serve as an "own vehicle". The own vehicle 1 may be installed with a driving assistant 2 that may execute, on driving operations by a driver, a driving assistance control including autonomous automatic driving. The driving assistant 2 may include an external environment recognizer that may recognize external environment surrounding the own vehicle 1, and may be constituted by various devices. The driving assistant 2 may receive signals from various sensors that detect travelling states of the own vehicle 1.

In the implementation, the driving assistant 2 may include a stereo camera unit 3, a sideward radar unit 4, and a backward radar unit 5, as sensing devices of the external environment. The stereo camera unit 3 may detect a three-dimensional position of an object forward of the vehicle 1. The sideward radar unit 4 may detect an object front-sideward of the vehicle 1. The backward radar unit 5 may detect an object behind the vehicle 1 by means of microwave or other waves. The driving assistant 2 may further include a traffic information communication unit 6. The traffic information communication unit 6 may obtain traffic information by means of infrastructure communication such as road-vehicle communication or inter-vehicle communication. The stereo camera unit 3, the sideward radar unit 4, the backward radar unit 5, and the traffic information communication unit 6 may constitute the external environment recognizer that may recognize the external environment of the vehicle 1.

The stereo camera unit 3 may include, for instance, stereo cameras, as its main component. The stereo cameras may be constituted by two laterally-disposed cameras 3a and 3b that are disposed in vicinity of a rear-view mirror on inner side of a windshield, in an upper part of vehicle interior. The two laterally-disposed cameras 3a and 3b may be shutter-synchronized cameras that each include an imaging device such as CCD (Charge Coupled Device) and CMOS (Complementary Metal Oxide Semiconductor), and may be fixed with a predetermined base line length.

The stereo camera unit 3 may further include an image processor, unitarily with the stereo cameras. The image processor may perform stereo image processing on a pair of images photographed in the laterally-disposed cameras 3a and 3b, to obtain information on a three-dimensional position, in real space, of a forward object, e.g. a preceding vehicle. The three-dimensional position of the object may be converted to coordinate values in a three-dimensional space, based on parallax data and an image coordinate value of the object. In the three-dimensional space, for instance, a road surface directly below a midpoint of the stereo cameras may serve as an origin, while a vehicle widthwise direction, a vehicle heightwise direction, and a vehicle lengthwise direction, i.e., a distance direction may serve as axes. The parallax data and the image coordinate value of the object may be obtained by means of the stereo image processing.

The sideward radar unit 4 may be proximity radar that detects an object at a relatively short distance around the own vehicle. The sideward radar unit 4 may be disposed, for instance, at right and left corners of a front bumper. The sideward radar unit 4 may send out radar wave such as microwave and millimeter wave of a high frequency band, and may receive a reflection wave from an object, to measure a distance and a direction of the object front-sideward of the own vehicle. A front-sideward zone of the own vehicle may fall outside a visual field of the stereo camera unit 3. The backward radar unit 5 may be disposed, for instance, at right and left corners of a rear bumper. The backward radar unit 5 may send out radar wave similarly, and may receive a reflection wave from an object, to measure a distance and a direction of the object behind or rear-sideward of the own vehicle.

Note that the backward object may be detected by means of image recognition using a rear-view camera, or by means of sensor fusion of the image recognition and data obtained by other sensing devices.

The traffic information communication unit 6 may obtain the traffic information, by means of road-vehicle communication via road ancillary equipment or inter-vehicle communication with another vehicle. The traffic information may be information on zones that are not viewed from, or not sensed by, the stereo camera unit 3, the sideward radar unit 4, and the backward radar unit 5, crossing roads, and other locations. Note that the traffic information communication unit 6 may be a dedicated device, but any other communication device provided in a positioning device such as a navigation device may serve as the traffic information communication unit 6. The navigation device may maintain map information of travelling environment such as positions of intersections and traffic signals, the numbers of road lanes, radii of curvature of roads, speed limits, and no-passing sections.

The sensors may detect the travelling states of the own vehicle 1. The sensors may include a speed sensor 10, a steering angle sensor 11, and a gravity (G) sensor 12. The speed sensor 10 may detect a vehicle speed. The steering angle sensor 11 may detect a steering angle. The G sensor 12 may detect acceleration. The driving assistant 2 may execute the driving assistance control of the vehicle 1, based on the traffic and environmental information and information on the travelling states of the own vehicle 1. The traffic and environmental information may be obtained by the stereo camera unit 3, the sideward radar unit 4, the backward radar unit 5, and the traffic information communication unit 6. The information on the travelling states of the own vehicle 1 may be detected by the sensors such as the speed sensor 10, the steering angle sensor 11, and the G sensor 12.

The driving assistance control of the driving assistant 2 may include a control of assisting with a quick and safe lane change. Non-limiting instances of the lane change may include passing a preceding vehicle and thereafter returning to a previous lane, and entering an adjacent lane on occasions such as passing through a junction of a highway. The driving assistant 2 may therefore include, as control functions related to the lane change, a proposed lane change section setting unit 20, a lane change determination unit 21, and a lane change information output unit 22. Thus, the driving assistant 2 may select a most suitable lane change section, based on positional relation and relative speeds to vehicles on the adjacent lane, allowing for lane change assistance in a congruous, more natural way.

The proposed lane change section setting unit 20 may recognize, based on road lane lines and other data, a lane on which the own vehicle is travelling and an adjacent lane that is adjacent to the lane on which the own vehicle is travelling. The recognition may be carried out based on outputs from the stereo camera unit 3, the sideward radar unit 4, the backward radar unit 5, the speed sensor 10, and other sensors. The proposed lane change section setting unit 20 may measure presence or absence of a plurality of vehicles around the own vehicle that are travelling on the adjacent lane. In one implementation, the plurality of vehicles around the own vehicle that are travelling on the adjacent lane may serve as "parallel-travelling vehicles". The proposed lane change section setting unit 20 may measure relative speeds and relative positions of the own vehicle to respective ones of the parallel-travelling vehicles, and inter-vehicle distances between two of the parallel-travelling vehicles. The proposed lane change section setting unit 20 provides setting of a proposed section where the own vehicle enters the adjacent lane, based on the relative speeds and the relative positions of the own vehicle to the respective ones of the plurality of parallel-travelling vehicles. In one implementation, the proposed section where the own vehicle enters the adjacent lane may serve as a "proposed lane change section".

In one specific but non-limiting instance, the proposed lane change section setting unit 20 provides the setting of the proposed lane change section, as follows. The proposed lane change section setting unit 20 may estimate coming-level time periods in which the own vehicle comes level with the respective ones of the parallel-travelling vehicles, based on the relative positions and the relative speeds of the own vehicle to the respective ones of the parallel-travelling vehicles, and may identify one of the parallel-travelling vehicles with which the own vehicle comes level in a shortest one among the coming-level time periods. Here, description is given with reference to FIG. 2 on an instance in which an own vehicle C0 is travelling on a lane Lr, and three parallel-travelling vehicles C1, C2, and C3 are travelling in the order named on an adjacent line Lrt. Note that the same may apply to a case with four or more parallel-travelling vehicles.

Figure 2:
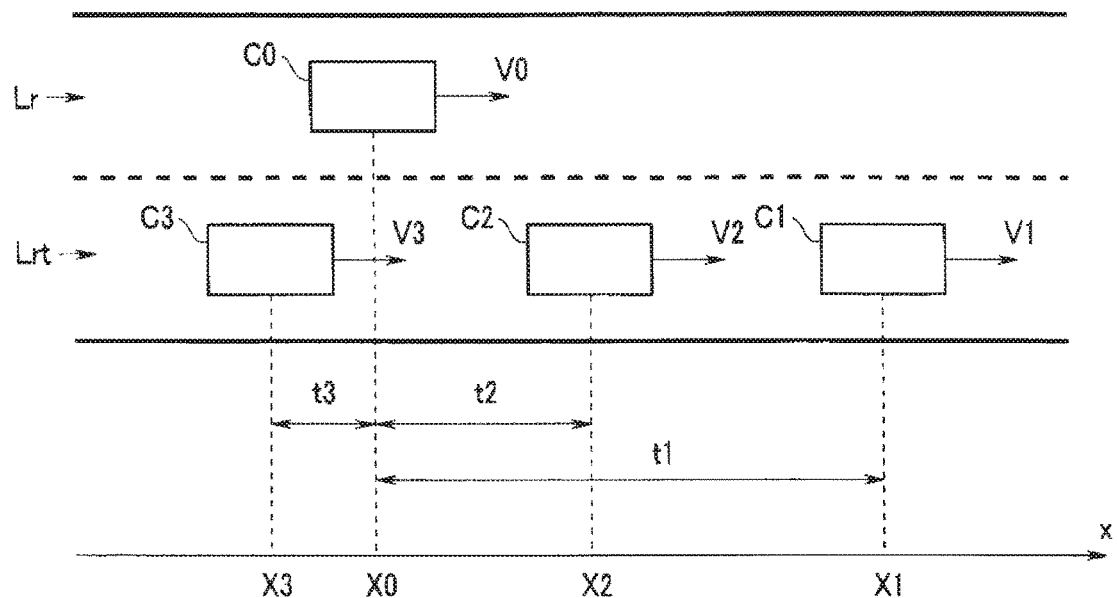
FIG. 2 illustrates an example of an own vehicle and parallel-travelling vehicles.

Referring to FIG. 2, let a travelling direction of the own vehicle C0 and the parallel-travelling vehicles C1 to C3 represented as an x direction. Let positions of the vehicles represented as X0, X1, X2, and X3. Let speeds of the vehicles represented as V0, V1, V2, and V3. Then, relative speeds Vr1, Vr2, and Vr3 of the own vehicle C0 to the parallel-travelling vehicles C1, C2, and C3 may be represented by the following expression (1). Relative positions Xr1, Xr2, and Xr3 of the own vehicle C0 to the parallel-travelling vehicles C1, C2, and C3 may be represented by the following expression (2). Inter-vehicle distances L1 and L2 between two of the parallel-travelling vehicles C1, C2, and C3 may be represented by the following expression (3).

$$Vri = Vi - V0 \quad (1)$$

$$Xri = Xi - X0 \quad (2)$$

$$Lj = Xj - X(j+1) \quad (3)$$

where i=1, 2, or 3 j=1 or 2

From the expressions (1) to (3), coming-level time periods t1, t2, and t3 in which the own vehicle C0 comes level with the respective ones of the parallel-travelling vehicles C1, C2, and C3 may be estimated by the following expression (4). A shortest one among the coming-level time periods t1, t2, and t3 may be associated with a position of one of the parallel-travelling vehicles C1 to C3 with which the own vehicle C0 comes level earliest. A section forward of or behind the thus-identified one of the parallel-travelling vehicles C1 to C3 may be designated as the proposed lane change section, i.e., a target section that the own vehicle C0 enters.

$$ti=Xri/Vri=(Xi-X0)/(Vi-V0) \qquad (4)$$

where i=1, 2, or 3

Figure 3:
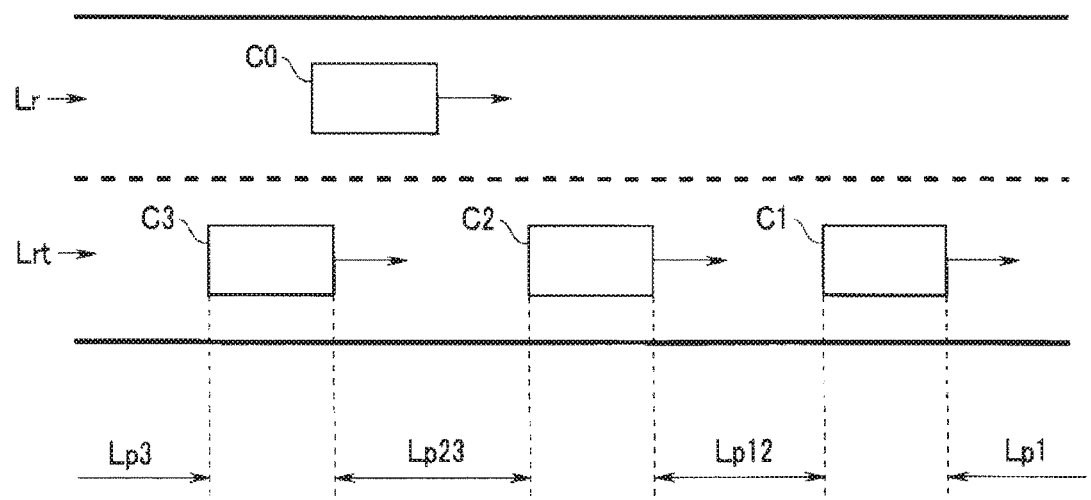
FIG. 3 illustrates an example of a proposed lane change section.

For instance, assume that the coming-level time period t3 is the shortest among the coming-level time periods t1, t2, and t3, that is, the own vehicle C0 comes level with the parallel-travelling vehicle C3 earliest. Then, the setting of the proposed lane change section may be provided as illustrated in FIG. 3, depending on positional relation of the own vehicle C0 to the parallel-travelling vehicle C3 as recited in the following (a) and (b).

(a) A case in which X3 is smaller than X0 (X3<X0)

A section between the parallel-travelling vehicles C2 and C3 (a section Lp23 in FIG. 3) may be set as the proposed lane change section.

(b) A case in which X3 is larger than X0 (X3>X0)

A section behind the parallel-travelling vehicle C3 (a section Lp3 in FIG. 3) may be set as the proposed lane change section.

The same may apply to a case in which the coming-level time period t1 or t2 is the shortest. When the coming-level time period t1 is the shortest, a section between the parallel-travelling vehicles C1 and C2 (a section Lp12 in FIG. 3: X1>X0), or a section forward of the parallel-travelling vehicle C1 (a section Lp1 in FIG. 3: X1<X0) may be set as the proposed lane change section, depending on positional relation of the own vehicle C0 to the parallel-travelling vehicle C1. When the coming-level time period t2 is the shortest, a section between the parallel-travelling vehicles C2 and C3 (a section Lp23 in FIG. 3: X2>X0), or a section between the parallel-travelling vehicles C1 and C2 (a section Lp12 in FIG. 3: X2<X0) may be set as the proposed lane change section, depending on positional relation of the own vehicle C0 to the parallel-travelling vehicle C2.

The lane change determination unit 21 may examine whether or not the proposed lane change section has a length, or a section distance, that is long enough to make the lane change. In one implementation, the length or the section distance may serve as a "length". When the proposed lane change section has the section distance long enough to make the lane change, the lane change determination unit 21 may determine whether or not it is allowable to safely execute the lane change, based on the speed of the own vehicle and a moving speed of the proposed lane change section.

The determination as to whether or not the proposed lane change section has the section distance long enough to make the lane change may be made by comparing the section distance Lk of the proposed lane change section to a setting value Lth. The setting value Lth may be a value obtained by adding a distance that is necessary to make the lane change to a vehicle body length of the own vehicle. The setting value Lth may be a fixed value set in advance in accordance with vehicle specifications, or may be variably set in accordance with the vehicle speed.

When the section distance Lk is shorter than the setting value Lth (Lk<Lth), the lane change determination unit 21 may determine that the lane change is unallowable, and may instruct the proposed lane change section setting unit 20 to provide resetting of the proposed lane change section. The proposed lane change section setting unit 20 may receive the instruction to provide the resetting of the proposed lane change section, and may provide the resetting of the proposed lane change section, based on a next shortest coming-level time period to the coming-level time period associated with the previously-set proposed lane change section, among the coming-level time periods in which the own vehicle comes level with the respective ones of the parallel-travelling vehicles.

Note that the proposed lane change section may be considered to have the section distance long enough to make the lane change (Lk>Lth), in a case in which the proposed lane change section is not a section between two of the parallel-travelling vehicles, e.g. the section Lp1 forward of the foremost parallel-travelling vehicle C1, or the section Lp3 behind the last parallel-travelling vehicle C3, as illustrated in FIG. 3.

In one alternative, the proposed lane change section setting unit 20 may make the determination as to whether the proposed lane change section has the section distance long enough to make the lane change. When the section distance Lk of the currently-set proposed lane change section is shorter than the setting value Lth, the proposed lane change section setting unit 20 may sequentially provide the setting of the proposed lane change section, based on the coming-level time periods. Finally, when no proposed lane change section has the section distance Lk equal to or larger than the setting value Lth, for instance, a flag that indicates there is no proposed lane change section may be outputted, and the processing may be shifted to a next phase.

Meanwhile, when the section distance Lk is equal to or larger than the setting value Lth (Lk>Lth), the lane change determination unit 21 may determine that the lane change is allowable, and may finally determine as to whether or not it is allowable to safely execute the lane change, based on a relative speed calculated from the speed of the own vehicle and the moving speed of the proposed lane change section. The moving speed of the proposed lane change section may be defined, as recited in the following (c) and (d), in accordance with the positional relation of the own vehicle to the parallel-travelling vehicles.

(c) A case in which the own vehicle is located between two of the parallel-travelling vehicles In this case, an average speed of the two parallel-travelling vehicles forward of or behind the own vehicle may serve as the moving speed of the proposed lane change section. When the own vehicle C0 is located between the two parallel-travelling vehicles Ci and C(i+1) (where i=1 or 2), the moving speed Vk of the proposed lane change section may be given by the following expression (5).

$$Vk=(Vi+V(i+1))/2 \qquad (5)$$

where i=1 or 2

(d) A case in which the own vehicle is not located between two of the parallel-travelling vehicles In this case, the speed of one of the parallel-travelling vehicles that is closest to the own vehicle may serve as the moving speed of the proposed lane change section. In an instance illustrated in FIG. 2, when the proposed lane change section is located behind the parallel-travelling vehicle C3, the moving speed Vk of the proposed lane change section may be equal to V3 as given in the following expression (6). When the proposed lane change section is located forward of the parallel-travelling vehicle C1, the moving speed Vk may be equal to V1 as given in the following expression (7).

$$Vk=V3 \quad (6)$$

$$Vk=V1 \quad (7)$$

The determination as to whether or not it is allowable to safely execute the lane change may be made by comparing an absolute value |Vk−V0| to a threshold value Vth. The absolute value |Vk−V0| may be an absolute value of the relative speed of the own vehicle to the proposed lane change section. The threshold value Vth may be a speed difference, i.e., an absolute value, between the moving speed of the proposed lane change section and a speed that allows the own vehicle to safely reach a position where the lane change is allowable. The threshold value Vth may be appropriately set in accordance with presence or absence of a preceding vehicle forward of the own vehicle or a following vehicle behind the own vehicle, a relative speed of the own vehicle to the preceding vehicle or the following vehicle, and other conditions.

When the absolute value |Vk−V0| is larger than Vth (|Vk−V0|>Vth), the lane change determination unit 21 may determine that it is unallowable to execute the lane change into the proposed lane change section. When the absolute value |Vk−V0| is equal to or smaller than Vth (|Vk−V0|≤Vth), the lane change determination unit 21 may determine that it is allowable to safely execute the lane change into the proposed lane change section. When it is allowable to execute the lane change into the proposed lane change section, the proposed lane change section may be decided as a lane change section that the own vehicle enters, i.e., the lane change section where the own vehicle makes the lane change. For instance, when making the lane change by means of automatic driving, the own vehicle may be accelerated or decelerated, and steering-controlled, to execute a lane change control into the lane change section.

The lane change information output unit 22 may perform a sound output, an image output, and any other form of output, to provide a driver with various information related to the lane change by means of an HMI (Human Machine Interface). In one specific but non-limiting implementation, the lane change information output unit 22 may provide a driver with, for instance, the presence or absence of the parallel-travelling vehicles, the relative speeds and the relative positions of the own vehicle to the respective ones of the parallel-travelling vehicles, presence of the following vehicle or the preceding vehicle, and allowability of the lane change. When the lane change is allowable, the lane change information output unit 22 may output, to a driver, a message to urge a driver to make the lane change in the form of sound or image. In a case of automatic driving, the lane change may be made automatically.

In automatic driving, the lane change may be made, for instance, as follows. Acceleration and deceleration of the own vehicle may be controlled by means of an electronic throttle device and a brake device (neither illustrated), to allow the own vehicle to move to a position where the lane change is allowable. Thereafter, a turn signal lamp may be blinked, while a power steering device (not illustrated) may be controlled to allow the own vehicle to move to the lane change section.

Figure 4:
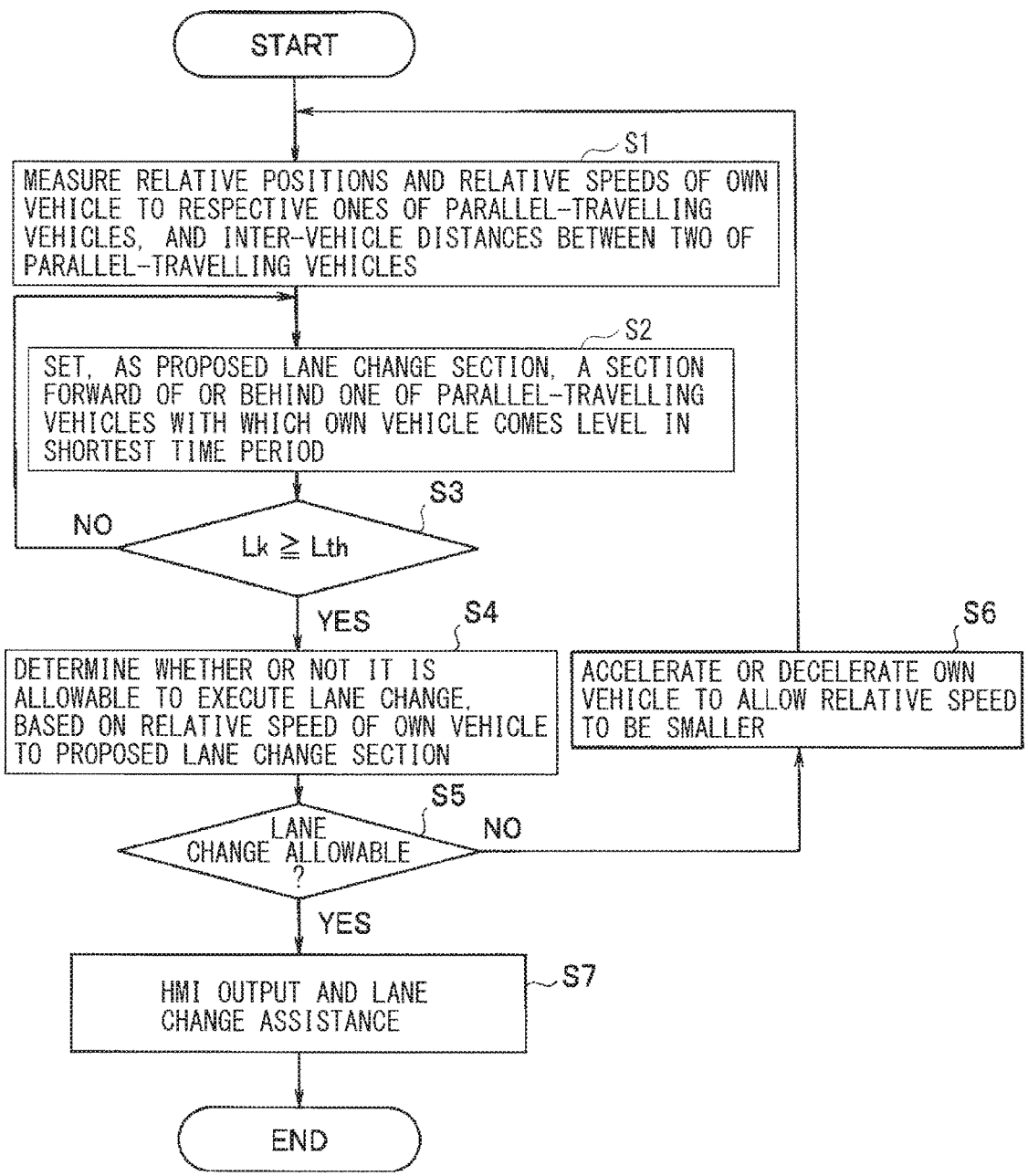
FIG. 4 is a flowchart of an example of processing of lane change assistance.

Description is now given, with reference to a flowchart in FIG. 4, on program processing carried out by the driving assistant 2, related to the lane change assistance as described above.

In lane change assistance processing illustrated in FIG. 4, first, in step S1, measurement may be made, based on the travelling environment recognized based on the outputs from the stereo camera unit 3, the sideward radar unit 4, the backward radar unit 5, the speed sensor 10, and other sensors. The measurement may include the presence or absence of the parallel-travelling vehicles on the adjacent lane that is adjacent to the lane on which the own vehicle is travelling, the relative speeds and the relative positions of the own vehicle to the respective ones of the parallel-travelling vehicles, and the inter-vehicle distances between two of the parallel-travelling vehicles.

The flow may proceed to step S2, in which the coming-level time periods in which the own vehicle comes level with the respective ones of the parallel-travelling vehicles may be estimated, based on the relative positions and the relative speeds of the own vehicle to the respective ones of the parallel-travelling vehicles. The setting of the proposed lane change section may be provided as the section forward of or behind one of the parallel-traveling vehicles with which the own vehicle comes level in the shortest coming-level time period. Thereafter, in step S3, the examination may be made as to whether or not the section distance Lk of the proposed lane change section as a lane change target is equal to or larger than the setting value Lth.

In step S3, when Lk is smaller than Lth (Lk<Lth), the currently-set proposed lane change section may be determined as too short, and the lane change may be determined as unallowable. In this case, the flow may return to step S2, in which the resetting of the proposed lane change section may be provided. Meanwhile, when Lk is equal to or larger than Lth (Lk≥Lth), the currently-set proposed lane change section may be determined as long enough to make the lane change. In this case, the flow may proceed to step S4.

In step S4, the determination may be made as to whether or not it is allowable to safely execute the lane change into the proposed lane change section, in view of the vehicle speed. As described, the determination as to whether or not it is allowable to safely execute the lane change into the proposed lane change section may be made by comparing the absolute value |Vk−V0| to the threshold value Vth. The absolute value |Vk−V0| may be the absolute value of the relative speed between the own vehicle and the proposed lane change section. When the absolute value |Vk−V0| is larger than Vth (|Vk−V0|>Vth), it may be determined that it is unallowable to execute the lane change. In this case, for instance, a flag may be reset, and a determination result of unallowability of the lane change may be recorded. When the absolute value |Vk−V0| is equal to or smaller than Vth (|Vk−V0|≤Vth), it may be determined that it is allowable to safely execute the lane change. In this case, a flag may be set, and a determination result of allowability of the lane change may be recorded.

Thereafter, in step S5, examination may be made as to the determination result regarding the lane change, by referring to the flag, for instance. When the lane change is unallowable, the flow may proceed to step S6. In step S6, acceleration or deceleration may be made to allow the relative speed of the own vehicle to the proposed lane change section to be smaller. Thereafter, the flow may return to step S1, and the processing of the setting of the proposed lane change section may be newly performed, while maintaining the travelling states as they are.

Meanwhile, when the lane change is allowable, the flow may proceed from step S5 to step S7, in which various information related to the lane change may be outputted to the HMI. Thereafter, the message to urge a driver to make the lane change may be outputted in the form of sound or image. In a case of automatic driving, a steering control may be made that involves accelerating or decelerating the own vehicle to allow the own vehicle to move to a position where the lane change is allowable, and blinking the turn signal lamp while allowing the own vehicle to automatically enter the proposed lane change section.

As described, in the implementation of the technology, the setting of the proposed lane change section is provided, based on the relative speeds and the relative positions of the own vehicle to the respective ones of the plurality of parallel-travelling vehicles. The determination is made as to whether or not the own vehicle is allowed to enter the proposed lane change section, based on the moving speed of the proposed lane change section and the speed of the own vehicle. Hence, it is possible to provide quick and safe lane change assistance in response to the travelling states of the plurality of parallel-travelling vehicles, even when the lane change seems difficult in view of the positional relation and the speed difference between the own vehicle and the plurality of parallel-travelling vehicles.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A driving assistant for vehicles that determines whether or not an own vehicle is allowed to enter an adjacent lane that is adjacent to a lane on which the own vehicle is travelling, and provides lane change assistance, the driving assistant for vehicles comprising a processor programmed to:
   estimate a plurality of coming-level time periods in which the own vehicle comes level with respective ones of a plurality of parallel-travelling vehicles on the adjacent lane and provide setting of a proposed lane change section that is a proposed section where the own vehicle enters the adjacent lane, on a basis of positional relation of the own vehicle to one respective one of the plurality of parallel-travelling vehicles with which the own vehicle comes level in a shortest one among the plurality of coming-level time periods; and
   determine whether or not the own vehicle is allowed to enter the proposed lane change section, on a basis of a moving speed of the proposed lane change section and a speed of the own vehicle, the moving speed being an average speed of two of the parallel-travelling vehicles in a case where the proposed lane change section is located between two of the plurality of parallel-travelling vehicles, and being a speed of one of the two of the plurality of parallel-travelling vehicles in a case where the proposed lane change section is not located between the two of the plurality of parallel-travelling vehicles, the one of the two of the plurality of parallel-travelling vehicles having the proposed lane change section set forward of or behind the own vehicle, wherein
   when the own vehicle is allowed to enter the proposed lane change section, the processor controls the own vehicle to enter the proposed lane change section.

2. The driving assistant for vehicles according to claim 1, wherein when a length of the proposed lane change section is smaller than a setting value, resetting of the proposed lane change section is provided, based on the coming-level time periods.

3. The driving assistant for vehicles according to claim 2, wherein the processor is further programmed to determine:
   that the own vehicle is allowed to enter the proposed lane change section, when an absolute value of a relative speed of the own vehicle to the proposed lane change section is equal to or smaller than a threshold value, and
   that the own vehicle is not allowed to enter the proposed lane change section, when the absolute value of the relative speed of the own vehicle to the proposed lane change section is larger than the threshold value.

4. The driving assistant for vehicles according to claim 1, wherein the processor is further programmed to determine:
   that the own vehicle is allowed to enter the proposed lane change section, when an absolute value of a relative speed of the own vehicle to the proposed lane change section is equal to or smaller than a threshold value, and
   that the own vehicle is not allowed to enter the proposed lane change section, when the absolute value of the relative speed of the own vehicle to the proposed lane change section is larger than the threshold value.

* * * * *